(12) United States Patent
Wojdylo

(10) Patent No.: US 9,627,941 B1
(45) Date of Patent: Apr. 18, 2017

(54) DRIVER FOR A TURBINE GENERATOR AIDED BY MAGNETIC LEVITATION

(71) Applicant: Henry Wojdylo, Hilo, HI (US)

(72) Inventor: Henry Wojdylo, Hilo, HI (US)

( * ) Notice: Subject to any disclaimer, the term of this patent is extended or adjusted under 35 U.S.C. 154(b) by 0 days.

(21) Appl. No.: 14/639,709

(22) Filed: Mar. 5, 2015

(51) Int. Cl.
| | |
|---|---|
| F01D 15/10 | (2006.01) |
| F02C 6/00 | (2006.01) |
| H02K 7/18 | (2006.01) |
| H02P 9/04 | (2006.01) |
| H02K 7/09 | (2006.01) |
| F03B 13/00 | (2006.01) |
| F03B 13/10 | (2006.01) |

(52) U.S. Cl.
CPC ............. *H02K 7/09* (2013.01); *H02K 7/1823* (2013.01)

(58) Field of Classification Search
USPC .......................................... 290/43, 44, 52, 55
See application file for complete search history.

(56) References Cited

U.S. PATENT DOCUMENTS

| | | | | |
|---|---|---|---|---|
| 4,196,946 A * | 4/1980 | Lipscomb | ........... | F16C 32/0427 310/90.5 |
| 4,720,640 A * | 1/1988 | Anderson | ............. | F03B 13/083 290/43 |
| 5,765,990 A * | 6/1998 | Jones | .................... | F03D 1/0608 415/2.1 |
| 6,527,699 B1 * | 3/2003 | Goldowsky | ........... | A61M 1/101 600/16 |
| 6,570,286 B1 * | 5/2003 | Gabrys | ............... | F16C 32/0476 310/90.5 |
| 6,770,995 B1 * | 8/2004 | Foshage | .............. | F16C 32/0414 310/90.5 |
| 7,410,123 B2 * | 8/2008 | Nunnally | ................ | B64C 27/20 244/23 C |
| 7,417,334 B2 | 8/2008 | Uchiyama | | |
| 7,471,022 B2 * | 12/2008 | Sortore | ............... | F16C 32/0459 310/216.009 |
| 7,687,948 B2 * | 3/2010 | Sortore | ............... | F16C 32/0459 310/216.022 |
| 7,944,069 B2 * | 5/2011 | Uchiyama | ................ | F03D 3/02 290/44 |
| 7,964,978 B1 | 6/2011 | Weissmann | | |
| 8,198,748 B1 * | 6/2012 | Korzen | ................... | F03D 9/002 290/44 |
| 8,362,731 B2 * | 1/2013 | Smith | ...................... | H02K 7/09 310/420 |
| 8,674,538 B2 * | 3/2014 | Lugg | ...................... | F03D 1/025 290/44 |

(Continued)

*Primary Examiner* — Pedro J Cuevas
(74) *Attorney, Agent, or Firm* — Fish & Richardson P.C.

(57) ABSTRACT

Driver for a turbine generator aided by magnetic levitation to enhance support without increasing friction. In one aspect, an apparatus includes an outer circular structure with a magnetic rail structure, an inner circular structure with a second magnetic rail structure, wherein the circular structures are magnetically levitated and freely rotational with respect to each other. The inner circular structure being mechanically coupled to a generator rotor so when the inner circular structure rotates, it imparts a rotational force on the generator rotor. In another aspect, the inner circular structure is rigidly fixed to an armature of a generator. In another aspect, the mechanical coupling comprises a plurality of turbine blades and/or a plurality of gear surfaces.

5 Claims, 3 Drawing Sheets

(56) References Cited

U.S. PATENT DOCUMENTS

| | | | | |
|---|---|---|---|---|
| 8,853,881 | B2* | 10/2014 | Andrews Hoegg | F03D 1/04 290/55 |
| 9,181,979 | B2* | 11/2015 | Fan | F16C 32/0429 |
| 9,388,795 | B1* | 7/2016 | Choi | F03D 11/0008 |
| 9,453,495 | B2* | 9/2016 | Coffey | F03D 3/005 |
| 9,470,210 | B2* | 10/2016 | Choi | F03D 9/002 |
| 2004/0069901 | A1* | 4/2004 | Nunnally | B64C 27/20 244/34 R |
| 2007/0040385 | A1* | 2/2007 | Uchiyama | F03D 3/02 290/44 |
| 2007/0278796 | A1* | 12/2007 | Power | F03D 5/04 290/43 |
| 2008/0073993 | A1* | 3/2008 | Sortore | F16C 32/0459 310/90.5 |
| 2009/0039740 | A1* | 2/2009 | Sortore | F16C 32/0459 310/68 B |
| 2011/0031760 | A1 | 2/2011 | Lugg | |
| 2012/0262095 | A1* | 10/2012 | Smith | H02K 7/09 318/135 |
| 2013/0119802 | A1* | 5/2013 | Smith | H02K 7/09 310/90 |
| 2013/0266429 | A1* | 10/2013 | Andrews | F03D 1/04 415/182.1 |
| 2013/0293050 | A1* | 11/2013 | Fan | F16C 32/0429 310/90.5 |

\* cited by examiner

US 9,627,941 B1

DRIVER FOR A TURBINE GENERATOR AIDED BY MAGNETIC LEVITATION

BACKGROUND

This specification describes technologies relating to drivers for turbine generators aided by magnetic levitation.

Electrical energy is frequently generated by turbine generators. Turbine generators convert the kinetic energy of passing fluid into electrical energy. A variety of fluids may power turbines. For example, turbine generators may harness kinetic energy from wind, water, or steam. The source of the passing fluid may be naturally found, such as in wind or water from a river, or artificially generated, such as steam produced by a fossil fuel power station.

Turbines generally comprise driving devices, such as blades, which move in response to passing fluid to generate rotational energy. As the driving devices move, they impart a torque onto a hub or circular member, causing it to rotate. This hub or circular member may mechanically couple the driving devices to a generator rotor. As the generator rotor rotates, it produces electrical energy as it rotates with respect to a generator stator.

While the driving devices of a turbine, such as turbine blades, may be simply cantilevered off of a hub, it is advantageous in some applications to provide further mechanical support to the driving devices. The driving devices may be supported at their distal ends by a circular member. However, it would be advantageous in some applications to further enhance this mechanical support. It would also be advantageous if this extra mechanical support did not significantly increase the friction of the turbine generator or compromise its efficiency.

SUMMARY

This specification describes technologies relating to drivers for turbine generators aided by magnetic levitation.

In general, one innovative aspect of the subject matter described in this specification can be embodied in an apparatus comprising a first circular structure that includes a first magnetic rail structure circumferentially disposed along a first surface of the first circular structure; a second circular structure that includes a second magnetic rail structure circumferentially disposed along a first surface of the second circular structure, wherein the second circular structure is proximately positioned relative to the first circular structure to cause the first magnetic rail structure and the second magnetic rail structure to be magnetically levitated and freely rotational with respect to each other; a mechanical coupling that couples the second circular structure to a rotor of a generator so that the second circular structure, when rotating relative to the first circular structure, imparts, by the mechanical coupling, a rotational force on the rotor of the generator that, in turn, causes the rotor of the generator to rotate.

Particular embodiments of the subject matter described in this specification can be implemented so as to realize one or more of the following advantages. The mechanical coupling that couples the second circular structure to a rotor may comprise driving devices, such as turbine blades. The second circular structure can provide support to the turbine blades. By suspending the second circular structure within a first circular structure and magnetically levitating the second circular structure therein, mechanical support is further enhanced. For example, where the generator rotor is horizontal and supports the second circular structure and turbine blades in a cantilevered fashion, the first circular structure may provide a force vertical to the ground to reduce stresses induced in the rotor shaft by gravity. More generally, the first circular structure can reduce forces that are orthogonal to the axis of a rotor shaft. This added support may advantageously expand the scope of materials that may be used to implement a given turbine generator.

By using magnetic levitation, the first circular structure adds support without introducing much, if any, friction into the turbine generator. The use of magnetic levitation is superior to alternative friction-reducing mechanisms, such as lubrication or ball bearings. Magnetic rails introduce less friction and require less maintenance than alternative friction-reducing mechanisms. The turbine can be designed such that the inner circular structure and the outer circular structure experience repulsive magnetic forces in a variety of directions, including within the same plane as the circular structures as well as perpendicular to this plane. Such a design provides more support to the turbine system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present invention is directed to an improved driver for a generator using magnetic levitation to reduce friction.

Figure 1A:
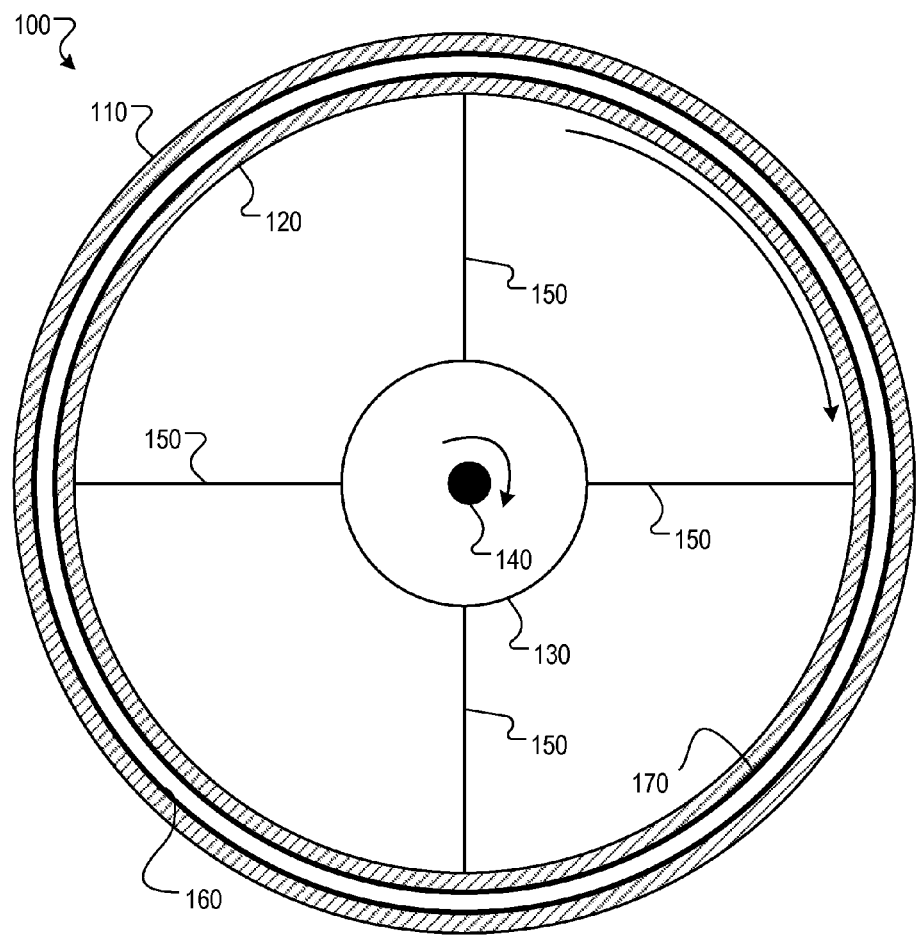
FIG. 1A depicts first and second circular magnetic structures operatively associated with a rotor of a generator.
Figure 1B:
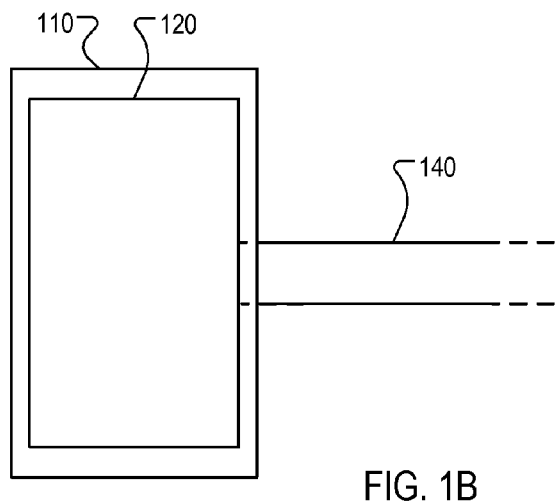
FIG. 1B is a side view of an example attachment to a rotor of a generator.

FIGS. 1A and 1B first and second circular magnetic structures operatively associated with a rotor of a generator. The generator driver 100 comprises an inner circular structure 120 and an outer circular structure 110. The outer circular structure 110 has a greater diameter than the inner circular structure 120. The inner circular structure 120 and the outer circular structure 110 are freely rotational with respect to each other. These structures may comprise a variety of materials, such as metal, polymers and ceramics. The inner circular structure 120 is concentrically disposed within the outer circular structure 110. The outer circular structure 110 can be mounted to some stationary body that is not shown, such as the ground, the inner walls of a flow chamber, a building, etc. The inner circular structure 120 is mechanically coupled by mechanical coupling means 150 to a generator rotor 130 so that when the inner circular structure 120 rotates, it imparts a rotational force on the rotor 130, causing it to rotate as well. The rotor 130 may be connected to a generator rotor shaft 140 which causes the rotational force to be transmitted some distance from the inner and outer circular structures to a generator. The generator shaft 140 may be connected to an AC generator and generate electrical energy as it rotates in relation to a stationary armature (not shown). The outer circular structure may be fixed to the armature and/or to another stationary body. FIG. 1B shows the inner and outer circular structures as seen from a side view. As can be seen, the inner circular structure 120, the outer circular structure 110, and the rotor can be positioned such that they share a common longitudinal axis.

The inner circular structure 120 has a magnetic rail structure 170 mounted to it. The outer circular structure 110 has a different magnetic rail structure 160 mounted to it. The magnetic rail structures are arranged such that they each experience a magnetic repulsive force with respect to one another. The magnetic rail structures are circumferentially disposed along the inner circular structure 120 and the outer circular structure 110. This disposition allows the structures to be repelled from one another regardless of the rotational orientation of one structure with respect to another. If one section of the inner circular structure 120 comes too close to a section of the outer circular structure 110, the magnetic repulsive force between the structures will increase due to the electromagnetic property that magnetic force between two repulsive bodies' increases as the distance between them decreases. This electromagnetic property has the effect of centering the inner circular structure 120 on the common longitudinal axis.

The magnetic rail structures are, in some implementations, contiguous. For example, the magnetic rail structures may each be a single continuous ring magnet. In other implementations, the magnet rails may be realized by spaced apart but circumferentially disposed magnets.

These magnetic forces reduce the stress imposed on the rotor 130 and rotor shaft 140. For example, where the common longitudinal axis of the generator driver is horizontal, the magnetic repulsive force on the inner circular structure resists the force of the Earth's gravity, which would otherwise cause part of the inner circular structure 120 to come into contact with part of the outer circular structure 110, generating a frictional force as the inner circular structure 120 rotates and negatively affecting the efficiency of the turbine.

Figure 2:
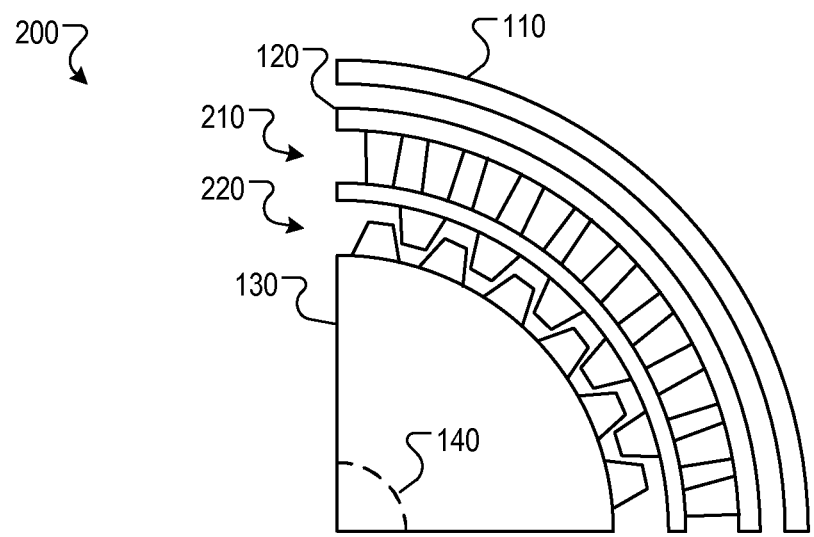
FIG. 2 is an example in which turbine blades are used to cause the inner circular member to rotate.

FIG. 2 is an example in which turbine blades are used to cause the inner circular member to rotate. The mechanical coupling comprises at least one or more driving devices 210 that causes the inner circular structure 120 and rotor 130 to rotate in response to a passing fluid. The driving devices 210 may be turbine blades, as illustrated in FIG. 2, or it may be any other mechanism which can harness the kinetic energy of the passing fluid to cause the rotor 130 to rotate. The shape and configuration of the blades 210 can be designed such that the efficiency of the generator driver 200 is optimized. The mechanical coupling may also comprise a plurality of gear surfaces 220. These gear surfaces define a transmission so that the rotational energy of the inner circular structure 120 is transmitted to the generator rotor 130. The gear surfaces 220 may be mounted on both the rotor 130 and the driving device 210. Advantageously, the gear surfaces 220 may form a gear reduction, further improving the efficiency of the generator driver 200. A variety of appropriate gear reduction systems may be used.

Figure 3:
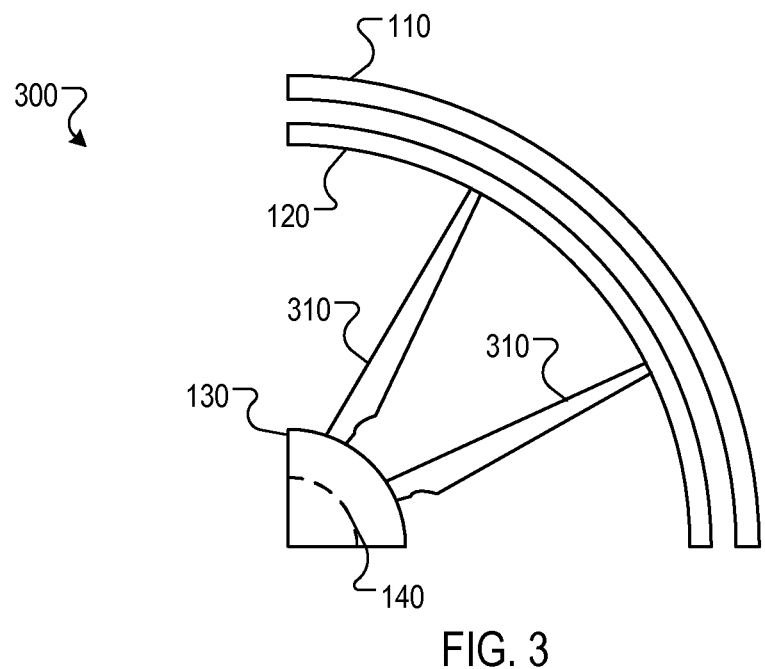
FIG. 3 is an example in which turbine blades directly couple the circular member to the rotor.

FIG. 3 is an example in which turbine blades directly couple the circular member to the rotor. The mechanical coupling comprises a plurality of blades 310. Fluid creates a rotational force on the inner circular structure 120 and rotor 130 as the fluid passes through the plurality of blades 310. Unlike the implementation of FIG. 2, the plurality of blades in FIG. 3 is rigidly fixed to the generator rotor 130.

Figure 4:
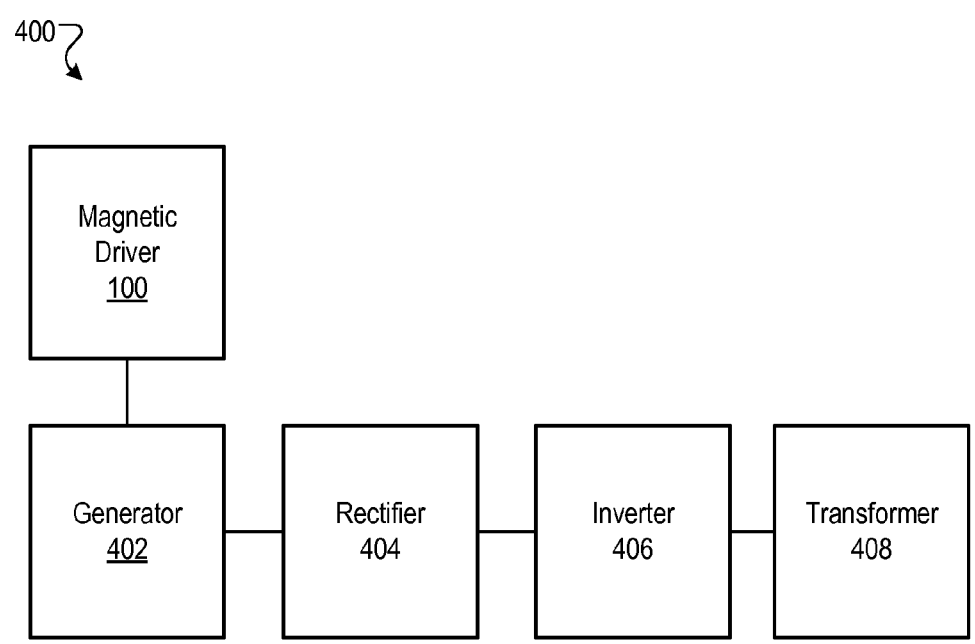
FIG. 4 is a basic block diagram of generator system.

FIG. 4 is a block diagram of a generator system 400. As described above, the driver 100 generates a rotational force which drives the rotor of an electrical power generator 402. In response, the generator 402 generates an AC current. This AC current is converted into a DC current by a rectifier 404. This DC current can be conditioned to the desired phase and frequency and then converted back to an AC current by inverter 406. Once the electrical energy is again in AC form, its voltage may be adjusted by a transformer 408 so it can be efficiently distributed to consumers. Variations of this arrangement, such as the use of an AC generator rather than a DC generator, are also possible.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An apparatus, comprising:
   a first circular structure that includes a first magnetic rail structure circumferentially disposed along a first surface of the first circular structure, wherein the first magnetic rail structure comprises one or more magnets;
   a second circular structure that includes a second magnetic rail structure circumferentially disposed along a first surface of the second circular structure, wherein the second magnetic rail structure comprises one or more magnets, and wherein the second circular structure is proximately positioned relative to the first circular structure to cause the first magnetic rail structure and the second magnetic rail structure to be magnetically levitated and freely rotational with respect to each other; and
   a mechanical coupling that couples the second circular structure to a rotor of a generator so that the second circular structure, when rotating relative to the first circular structure, imparts, by the mechanical coupling, a rotational force on the rotor of the generator that, in turn, causes the rotor of the generator to rotate;
   wherein:
   the first circular structure is of a first diameter and the second circular structure is of a second diameter that is smaller than the first diameter of the first circular structure, and the second circular structure is positioned within the first circular structure;
   the first circular structure, the second circular structure, and the rotor are each positioned such that their respective longitudinal axes define a common longitudinal axis; and
   the first magnetic rail structure is disposed at the first diameter and the second magnetic rail structure is disposed at the second diameter and are further proximately positioned such that the repulsive force between them has the effect of centering the second circular structure on the common longitudinal axis.

2. The apparatus of claim 1, wherein the first circular structure is rigidly fixed to an armature of the generator.

3. The apparatus of claim 1, wherein the mechanical coupling comprises a plurality of turbine blades.

4. The apparatus of claim 1, wherein:
   the mechanical coupling comprises a plurality of gear surfaces that define a transmission connecting the second circular structure and the rotor; and
   further comprising at least one or more driving devices that cause the second circular structure to rotate.

5. The apparatus of claim 4, wherein the one or more driving devices comprise one or more turbine blades.

* * * * *